Nov. 3, 1953     C. H. FOLMSBEE     2,657,897
VALVE WITH RESILIENT PRESSURE ACTUATED SEAL
Filed July 30, 1947
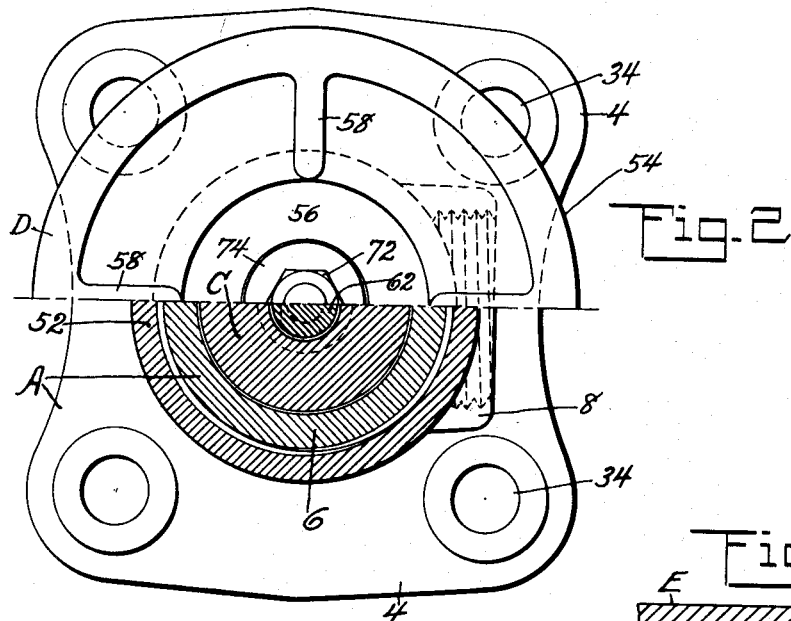
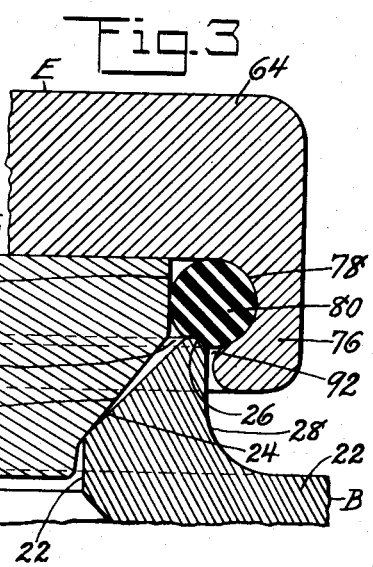
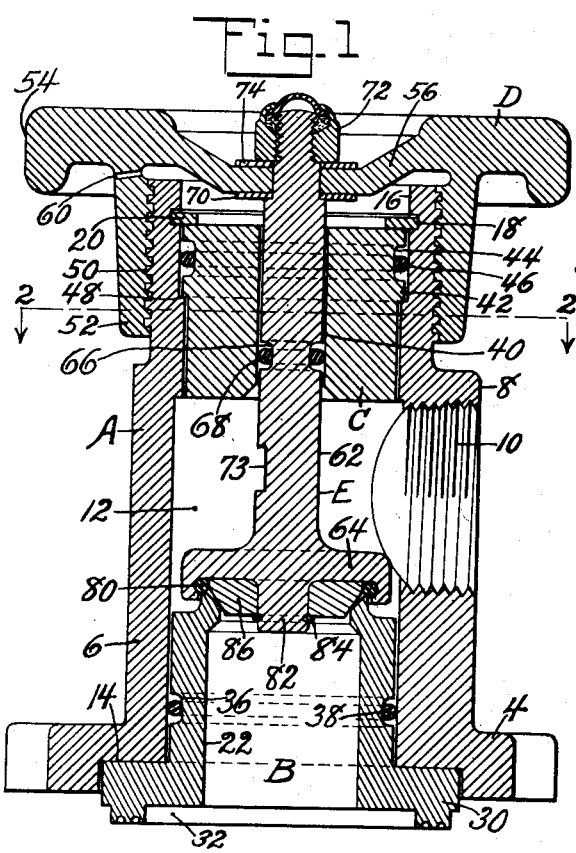
INVENTOR
Clyde H. Folmsbee
BY
Robert A. Shields
ATTORNEY Patented Nov. 3, 1953

2,657,897

UNITED STATES PATENT OFFICE 2,657,897

VALVE WITH RESILIENT PRESSURE ACTUATED SEAL

Clyde H. Folmsbee, Bloomsburg, Pa., assignor to American Car and Foundry Company, New York, N. Y., a corporation of New Jersey Application July 30, 1947, Serial No. 764,662

4 Claims. (Cl. 251—27)

This invention relates to valves in general and in particular to angle type valves having all leakage surfaces sealed by resilient pressure actuated seals substantially free of mechanically imposed pressure.

Valves as generally constructed have been made of castings requiring a considerable amount of machining and rejections due to porosity of the castings. Also, the valves have required a considerable amount of machining, threading, etc., so as to permit the use of gaskets and compressible packings. The conventional use of pressure packings has resulted in valves being hard to operate when the packings are tightened sufficiently to prevent leakage and this is particularly true of the higher pressure types of valves. It is an object, therefore, of the present invention to provide a compact, light weight valve which can be easily operated when under pressure and by a minimum diameter of operating wheel.

A further object of the invention is the provision of a compact, light weight valve which does not require excessively fine machining, yet will be effectively sealed at all joints by resilient packings substantially free of any but line pressure.

A still further object of the invention is the provision of a valve which when closed has its seat sealed by a resilient member shiftable toward the leakage space and substantially free of any but line pressure.

Yet another object of the invention is the provision of a valve having the body and other parts made of drop forgings, thereby permitting lighter weight with greater strength and without porosity.

These and other objects of the invention will be apparent to persons skilled in the art from a study of the following description and accompanying drawings, in which Fig. 1 is a sectional view taken substantially through the vertical central part of the valve;

Fig. 2 is a part plan part sectional view taken substantially on line 2—2 of Fig. 1; and Fig. 3 is an enlarged sectional view of the valve seat seal.

Referring now to the drawings in detail, it will be seen that the body A is preferably made as a drop forging having a bolting flange 4 from which extends upwardly the substantially tubular main body portion 6. This main body portion is provided on one side with an embossment 8 having an opening therein internally threaded as at 10 to be connected into a pipe line. This embossment may, when desired, be made larger to provide bolting flanges instead of the threaded connection shown. The upstanding cylindrical main body portion is bored out from the bottom as at 12, while the flange is bored out as at 14 to provide a shoulder. The top portion of the body portion is bored out as at 16 and then grooved as at 18 to receive a snap ring 20.

The bore 12 has fitted therein a body seat member B which may be preferably made as a drop forging with an internal passage 22 surrounded at its upper edge by a beveled seat 24, which seat terminates at its upper edge in a rounded tip or lip 26 merging into an upstanding portion 28 spaced from the bore 12 as clearly shown in Figs. 1 and 3. The bottom portion of the valve seat member is shouldered as at 30 and provided with a grooved projection 32 adapted to cooperate with a gasket placed between the valve seat member B and the tank or other structure to which the valve body is attached. The valve is attached to the tank or other structure by means of bolts or other devices passing through openings 34 formed in the bolting flange 4. It is, of course, obvious that the valve may be attached to the tank or other structure by means other than the bolting flange shown. Since leakage could occur between the removable valve seat member B and the bore 12, the outside surface of the upstanding portion of the removable valve seat member is grooved as at 36 to receive an annulus of resilient material 38 having a circular cross-section. This annulus is of such a dimension as to snap over the upstanding portion of removable seat member B and be slightly compressed between the bore 12 and the bottom of groove 36.

Seated within the bore 16 is a removable stem guide member C which may be formed either as a drop forging or cut from a piece of round. The member C has a central opening 40 formed therein to receive the valve stem later to be referred to. The outside portion of the stem guide member is machined as at 42 to fit within the bore 16 and this machined portion 42 has a groove 44 formed therein into which can be snapped an annulus of resilient material 46 and of circular cross-section. This annulus will be lightly compressed between the bottom of the groove 44 and the bore 16. The stem guide member is held in position by the snap ring 20, previously referred to, and rests upon a slight shoulder 48 formed within the valve body.

The upper, outer portion of the upstanding portion of the valve body is threaded as at 50 to cooperate with similar threads cut in the sleeve portion 52 of the hand wheel or operating member D. This hand wheel or operating member is preferably formed as a drop forging having the sleeve 52, previously referred to, and the roughened gripping rim 54. The web 56 of the wheel is preferably depressed and braced by ribs 58 and has a hole drilled in the central portion thereof for reception of the upper end of the valve stem later to be referred to. Since air may be trapped within the sleeved wheel a small vent hole 60 is preferably bored through the sleeve and into the interior, thereby venting the same and preventing build up of pressure within the sleeved hand wheel.

The valve member E is likewise preferably formed of a drop forging having a stem 62 projecting upwardly from the enlarged valve portion 64. The stem 62 extends through the hole 40 of the stem guide member C and has a groove 66 cut therein into which can be snapped an annulus 68 formed of resilient material of circular cross-section. This annulus will be of such a size as to be lightly compressed within the hole 40 formed in the stem guide member C. The upper end of the stem is reduced in diameter to provide a shoulder for reception of a bearing washer 70 and the stem projects through the web of the hand wheel and is threaded to receive a lock nut 72 which may be tightened down onto a bearing washer 74. The bearing washers 70 and 74 are preferably of the oil impregnated or self-lubricating type in order that the friction between the stem and hand wheel may be reduced to a minimum. In order that the lock nut can be applied and removed the stem is provided with a flattened or wrench-receiving area 73 accessible through the discharge opening in embossment 8. The enlarged valve portion 64 is formed with a depending lip 76 under cut as at 78 to provide an outer bearing surface for an annulus 80 formed of resilient material and of circular cross-section. The stem projection 82 has a groove cut therein to receive a snap ring 84 adapted to retain the seat washer 86 in position. This seat washer is provided with a beveled seat 88 formed at a slightly different angle than the seat 24, previously referred to, and merges into a surface 90 spaced from the undercut 78 a distance sufficiently great as to but lightly compress the resilient annulus 80 in a horizontal direction. The seats 24 and 88 are so arranged as to contact each other when the valve is closed so that the lip 26 will but lightly bear upon the resilient annulus 80 and compress the same very slightly in a substantially vertical direction. It should be noted that the lip 76 overlaps the upstanding portion 28 of the removable valve seat member B and provides a definite clearance 92 therebetween. It should also be noted that while the valve seats 88 and 24 have been shown as formed at slightly different angles, they could be formed at the same angle, but in any case a small space 94 would be provided between the seat 24, annulus 80 and edge 90 of the washer 86.

Since the valve seats 88 and 24 need not be carefully machined or lapped, leakage may occur and any leakage will cause the annulus 80 to shift toward and partially into the clearance 92 and the higher the line pressure, the tighter the annulus is wedged toward the clearance. Since the annulus is of resilient material it can conform to slight irregularities on the lip 26 and undercut 78, thereby effectively preventing leakage. In case the pressure should be acting in the opposite direction, it would cause the resilient ring to shift into the clearance space 94, thus again effectively sealing the valve against leakage. In other words, the resilient annulus 80 will effectively seal against leakage in either direction and it can never be destroyed by excessive pressure applied by the wheel D, since the metallic seats 24 and 88 predetermine the amount of mechanical compression placed upon the annulus 80.

When the valve is in an open position the annular rings 38, 46 and 68 will effectively prevent any leakage between the members which they contact. These rings like the ring 80 will be urged by the pressure into the clearance space between the parts and effectively prevent any leakage between the members or, in other words, along the leakage surfaces. These rings will function in either direction and in the same manner as described in connection with annulus 80. In other words, these rings 38, 46 and 68 can shift within their respective grooves under line pressure and be wedged by the line pressure into the clearance space between the members. In case the line pressure is subatmospheric, then the rings will be wedged into the clearance space in the opposite direction, thus it will be seen that the valve can be used either on high line pressures or vacuum line pressures and will effectively seal against leakages. Since the rings or annuli of resilient material are but lightly compressed, there can be no excessive friction between the parts such as is present in mechanically packed valves. The only friction of any quantity will be that existing between the stem and hand wheel due to the line pressure thrust upon the valve portion 64 when the valve is in closed position.

With the valve constructed as shown of drop forgings the parts may be made much lighter than normally, and due to the sleeved type of hand wheel the overall clearance or height of the valve may be greatly reduced. It will, of course, be obvious that certain parts not subject to line pressure, such as the hand wheel, could be made of castings if it is so desired. It will also be obvious that all of the parts can be made of castings, but applicant prefers to make the parts of drop forgings in order that the weight and size of the valve can be reduced, thereby taking full advantage of the improved method of sealing the leakage surfaces. While the valve has been described more or less in detail with specific reference to the one form, it will be obvious that the parts may be readily rearranged to produce other types of valves without departing from the scope of the invention as defined by the following claims.

What is claimed is:

1. In a valve, a valve body having intersecting passages therethrough for the flow of matter under pressure, a body seat member in one of said passages and formed with a body valve seat, an upstanding lip formed on said body seat member outwardly of the valve seat, a valve stem member in one of said passages, a depending lip on said valve stem overlapping and spaced from said upstanding lip to define a predetermined clearance space therebetween, a groove formed in said depending lip and having its lower edge extending below the upper edge of said upstanding lip when said valve is closed, an annular resilient member of substantially circular cross-section located in said groove and having its inner lower surface lightly compressed against the upper and outer edge of said upstanding lip, and means fastened to said valve stem member to retain said annular member in said groove, said means engaging said body valve seat to limit the approach of said valve stem member toward said body seat member when said valve is closed whereby said annular member cannot be compressed beyond a predetermined minimum.

2. In a valve, a valve body having intersecting passages therethrough for the flow of matter under pressure, a body seat member in one of said passages and formed with a body valve seat, an upstanding lip formed on said body seat member outwardly of the valve seat, a valve stem member in one of said passages, a depending lip on said valve stem overlapping and spaced from said upstanding lip to define a predetermined clearance space therebetween, a semi-circular groove formed in said depending lip, and having the lower edge thereof extending below the upper edge of said upstanding lip when said valve is closed, an annular resilient member of substantially circular cross-section located in said semi-circular groove with its centroid located outwardly of said upstanding lip and having its lower inner surface lightly compressed against the upper edge of said upstanding lip, and means fastened to said valve stem member to retain said annular member in said groove, said means engaging said body valve seat to limit the approach of said valve stem member toward said body seat member when said valve is closed whereby said annular member cannot be compressed beyond a predetermined minimum.

3. In a valve, a valve body having intersecting passages therethrough for the flow of matter under pressure, a body seat member in one of said passages and formed with a body valve seat, an upstanding lip formed on said body seat member outwardly of the valve seat, a valve stem member in one of said passages, a depending lip on said valve stem overlapping and spaced from said upstanding lip to define a predetermined clearance space therebetween, a semi-circular groove formed in said depending lip and having its lower edge extending below the upper edge of said upstanding lip when said valve is closed, an annular resilient member of substantially circular cross-section located in said groove and having its centroid located substantially vertically above said predetermined clearance space and having its lower surface lightly compressed against the upper edge of said upstanding lip, and means fastened to said valve stem member to retain said annular member in said groove, said means engaging said body valve seat to limit the approach of said valve stem member toward said body seat member when said valve is closed whereby said annular member cannot be compressed beyond a predetermined minimum.

4. In a valve, a valve body having a body seat member formed with a body valve seat, an upstanding lip formed on said body seat member, a valve stem member movably mounted in said valve, a depending lip formed on said valve stem member overlapping and laterally spaced from said upstanding lip, an annular resilient member of substantially circular cross-section bearing on said lip when said valve is closed, and retaining means secured on said valve stem member to retain said annular member in bearing engagement with said depending lip, said retaining means bearing on said body seat and so formed and arranged as to provide clearance space therebetween adjacent said annular member, and said annular member being deformable under pressure of matter in the valve and shiftable toward said clearance space to seal said valve.

CLYDE H. FOLMSBEE.

References Cited in the file of this patent

UNITED STATES PATENTS

| Number | Name | Date |
| --- | --- | --- |
| 1,792,945 | Van Deventer | Feb. 17, 1931 |
| 1,808,254 | Rice | June 2, 1931 |
| 1,861,916 | Hennebohle | June 7, 1932 |
| 1,868,665 | Kuhnle | July 26, 1932 |
| 1,983,163 | Buckman | Dec. 4, 1934 |
| 2,114,789 | Urquhart | Apr. 19, 1938 |
| 2,123,477 | Sheedy | July 12, 1938 |
| 2,147,332 | Cornelius | Feb. 14, 1939 |
| 2,417,494 | Hoof | Mar. 18, 1947 |
| 2,431,437 | Van Der Werff | Nov. 25, 1947 |

FOREIGN PATENTS

| Number | Country | Date |
| --- | --- | --- |
| 421 | Great Britain | of 1885 |
| 12,911 | Great Britain | of 1904 |